(12) United States Patent
Sassa et al.

(10) Patent No.: US 6,921,606 B2
(45) Date of Patent: Jul. 26, 2005

(54) COMPOSITE FILMS FOR ELECTROCHEMICAL DEVICES

(75) Inventors: Robert L. Sassa, Newark, DE (US); David Zuckerbrod, Baltimore, MD (US); Wolfgang Buerger, Hockessin (DE); John E. Bacino, Newark, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 264 days.

(21) Appl. No.: 10/124,526

(22) Filed: Apr. 16, 2002

(65) Prior Publication Data

US 2003/0194599 A1 Oct. 16, 2003

(51) Int. Cl.[7] ............ H01M 4/86; H01M 4/88; H01M 12/06
(52) U.S. Cl. ............ 429/42; 429/27; 29/623.4; 502/101
(58) Field of Search ............ 429/27, 28, 40, 429/42; 29/623.1, 623.4; 502/101

(56) References Cited

U.S. PATENT DOCUMENTS

| | | | |
|---|---|---|---|
| 4,576,861 A | 3/1986 | Kato | 428/316.6 |
| 5,053,375 A | 10/1991 | Rao | 502/101 |
| 6,248,476 B1 | 6/2001 | Sun et al. | 429/224 |
| 6,558,828 B1 * | 5/2003 | Guo | 429/27 |

FOREIGN PATENT DOCUMENTS

| WO | WO 95/32093 A1 | 11/1995 |
|---|---|---|
| WO | WO 01/59862 A2 | 8/2001 |

* cited by examiner

Primary Examiner—Jonathan Crepeau
(74) Attorney, Agent, or Firm—Allan M. Wheatcraft

(57) ABSTRACT

Composite film articles and assemblies that include at least one layer of expanded fluoropolymer bonded to at least one thermoplastic sheet are fabricated using a method which can adjust the gas and liquid permeability of the composite film assemblies. These composite film articles and assemblies optionally have electroactive properties and a thin porous metallic overlayer that can serve as a current collector, and can be used in electrochemical devices such as air depolarized cells.

18 Claims, 8 Drawing Sheets

Front view

Side view

COMPOSITE FILMS FOR ELECTROCHEMICAL DEVICES

FIELD OF INVENTION

This invention relates to thin fluoropolymer/thermoplastic resin composite films, their manufacture, and uses thereof. More specifically, the present invention relates to composite film assemblies which are bonded durably to each other and can include a membrane separator, at least one electroactive layer, an ultrathin conductive metal layer, and a hydrophobic gas permeable membrane which can serve to modulate the gas permeability while preventing liquid permeation of the composite film.

BACKGROUND OF INVENTION

Electrochemical devices such as zinc/air primary batteries and nickel/hydrogen satellite batteries use barrier materials and/or gas diffusion membranes. Often the required permeability of these films to gases or vapors varies depending on the intended use, and can range from microporous, high flow-rate, membranes to very dense, (almost full density) fluoropolymer membranes (as in air depolarized cells). This range of permeabilities is typically realized by choosing membranes with different pore sizes and/or porosities.

Gas diffusion membranes have been used with gas diffusion electrodes at the anode, cathode, or both. For instance, a nickel-hydrogen battery uses a hydrogen electrode, the zinc-air battery uses an oxygen electrode, and the alkaline fuel cell uses both. The main advantages to using a gas diffusion electrode are that the reagents necessary for the electrochemical reaction can be stored outside the immediate electrochemical cell (as in the case for the hydrogen electrode) or absorbed from the environment (as in the case of the oxygen electrode). In particular, the zinc-air battery has an energy density of about twice that of an alkaline zinc-manganese dioxide battery because only the zinc needs be stored within the battery. Oxygen for the cathode reaction is supplied from the ambient air.

In the manufacturing process of many electrochemical cells, a thin, flexible polymer sheet is processed between rollers on automated or semi-automated equipment. Because this process puts considerable stress on the sheet as it is pulled from the rollers, it is necessary that the sheet has a sufficiently high tensile strength to survive the process.

Additionally, under certain conditions, the electrochemical cell components can change dimensions radically. For example, when a Zn/air cell is exposed to a high relative humidity environment (e.g, >60% RH) it will absorb $H_2O$ and swell, creating significant pressure on the air cathode. In this situation, existing hydrophobic gas diffusion membranes may even debond or delaminate from the active layer. This can result in a phenomenon called "flooding", wherein electrolyte leaks out of the cell or displaces most of the air in the catalytic active layer, thereby reducing the electrical power output.

Extremely aggressive reduction or oxidation reactions are present inside many electrochemical cells. Often the hydrophobic gas diffusion layers must survive years in this environment with no loss of mechanical strength or change in physical structure. Fluoropolymers are a common material of choice since they have excellent chemical resistance.

The intended use of an electrochemical device may delineate the physical and chemical requirements of the gas diffusion membrane or barrier material. For example, batteries designed to be used in devices that could be shaken or subjected to repeated or sudden vibrations must be able to perform even after sustaining repeated mechanical shocks. Humidity and temperature extremes are also a common test for the final packaged electrochemical cell.

A schematic representation of an exemplary prior art zinc/air button cell 100 is given in FIG. 1. The cell 100 includes an anode can 130 having zinc anode material 120 that is mixed with an electrolyte and optionally with a gelling agent. The cathode can 140 includes a separator 110, an air electrode with a catalytically active layer embedded in a metal mesh that acts as a current collector, a bonded hydrophobic membrane, a loose diffusion membrane, and optionally an air distribution layer.

In a known method of fabricating a catalytically active layer, a thin, flexible polymer sheet is processed by nip roll processing and then adding a Ni mesh by paint coating. In another known method, a polymer sheet is formed by paste extrusion and calendered before being laminated to an expanded nickel metal collector. As in the case for the thin polymer sheets mentioned above, the manufacturing process of the catalytically active layer is also performed with automated or semi-automated equipment that stresses the sheet. Thus, the sheet must have a sufficiently high tensile strength to survive this process and further processing. In most commercial applications, the strength is provided by the metal mesh. An additional complication is that, under certain conditions, the electrochemical cell components in contact with the electrolyte can change dimensions radically if just paste extruded and not sintered.

As an example of a prior art device, there is known an air depolarized cell which uses a nickel grid as the metal support for the catalyst. The supported catalyst layer is prepared by mixing manganese dioxide with activated carbon to produce a paste that is applied directly onto the nickel grid. The paste/grid assembly is then dried and bonded to a hydrophobic polymer, such as a fluorocarbon polymer, which serves as a gas diffusion membrane. In an alternative embodiment of this prior invention, the activated carbon is replaced by sintered nickel to improve the conductivity and the efficiency of the current collection. Although this method can be used to produce a serviceable air cathode, it is likely that the reliance on using a metal grid (and optionally sintered nickel in the catalyst) makes the battery expensive and undesirably heavy.

In another prior air depolarized cell, an electrode is pressed into a perforated steel drum that is used to reinforce the electrode and to collect current. A perforated metallic lid is used as the gas diffusion membrane. However, it is known in the art that manufacturing this type of cell is difficult in practice, because the inner surface of the casing neck edge almost invariably becomes fouled as the electrode is pressed into the perforated steel drum.

Other prior air depolarized cells have relied on using a metal wire as the current collector. One example of such a device uses a metal wire that is wound in the shape of a helix and embedded in the catalytically active material. However, a potential drawback of this approach is that the wire only provides one current collection path, so that the current collection efficiency of the cell would be significantly reduced if the wire were to break.

There are also prior art examples of air diffusion membranes. For example, one known type of membrane is made from a relatively thin (0.05–0.15 mm) microporous sheet of polytetrafluoroethylene (PTFE). To reduce the rate at which oxygen arrives at the catalytically active sites, the gas diffusion membrane is wound multiple times around the catalytically active layer. A major drawback of this approach, however, is that the multiple windings of the gas diffusion membrane occupy space that would otherwise be used to store more anode material.

Another prior art membrane is constructed from a porous plate of active carbon that is rendered hydrophobic by the incorporation of polystyrene. As with the previously described membrane, this design suffers from the drawback that the gas diffusion membrane is bulky and occupies space that would otherwise be used to store more anode material.

A further prior art membrane is made from a thin metallic sheet which has small apertures that are formed by laser drilling. Although this approach can be used to fabricate well-defined gas-inlet apertures, large scale manufacturing of this type of gas diffusion membrane is likely to be impractically slow. Furthermore, since the metal membranes do not permit lateral oxygen diffusion, the distribution of oxygen to the catalyst layer is non-uniform.

Another prior art approach involves using a heat shrinkable plastic material to encase the cathode portion of the cell. In order to increase current output for high drain applications, the heat shrinkable plastic material is cut at predetermined points to produce slits that are up to 0.13 cm. wide. For low drain applications, the slit dimensions are reduced. However, the process of putting such macroscopic slits in the gas diffusion membrane very likely leads to grossly non-uniform lateral distribution of oxygen to the catalyst.

SUMMARY OF THE INVENTION

This invention provides articles for metal/air electrochemical cells. The articles may be in the form of composite films, electrodes and/or electrode assemblies.

This invention provides a method for tailoring the permeability of a single type of film for use as membranes or barrier material for different electrochemical devices and the resulting membrane or barrier material.

This invention also provides a gas diffusion electrode which does not require a metallic screen, metallic foil or expanded metallic foil for mechanical support or for enhancing the in-plane electrical conductivity of the electrode.

An aspect of this invention is to provide a composite membrane containing an expanded fluoropolymer layer having a discontinuous adhesive fluoropolymer layer on one of its major surfaces.

Another aspect of the present invention is to provide a fabricating method in which a discontinuous layer of the thermoplastic fluoropolymer is formed on at least one side of a fluoropolymer membrane.

An aspect of the present invention is to provide an air cathode for a metal/air cell utilizing a composite film assembly containing an expanded fluoropolymer layer that has a discontinuous adhesive fluoropolymer layer on one of its major surfaces and that is durably bonded to an electroactive layer containing a metallic current collector.

Yet another aspect of the invention is to provide a method for fabricating an electrode, which includes a composite film of a fluoropolymer (such as ePTFE) and a thermoplastic resin, wherein the composite film is perforated in a random or regular pattern prior to being thermally bonded to an electrochemically active and electrically conductive layer.

One aspect of the invention is to provide an air permeable, electrically conductive hydrophobic composite film comprising a fluoropolymer and a thermoplastic polymer blended with conductive carbon, such that the composite film is durably bonded to a catalytically active electrode.

Another aspect of the present invention is to provide a composite gas diffusion electrode having at least one major surface that has been coated with a metal. The metal layer has sufficient porosity to allow the conduction of ions or the diffusion of gas through its pores. The metal layer is highly electrically conductive in the in-plane (x-y) direction, shows penetration into the catalytically active layer and has a high specific surface area.

Another aspect of the present invention is to provide a gas diffusion electrode assembly in which a metallized carbon/catalyst/PTFE composite material has been bonded to a composite membrane having at least one layer of expanded fluoropolymer with at least one major surfaces bonded to a discontinuous layer of a polymeric fluoropolymer.

Another aspect of the present invention is to provide an air depolarized cell with an increased anode volume by using thin gas diffusion membranes.

One aspect of this invention is to provide an air cathode for an air depolarized cell that includes a composite fluoropolymer film with an adjustable gas permeability that can be used to control the limiting current of the air depolarized cell.

Another aspect of this invention is to provide a method of making an air depolarized cell, wherein the gas diffusion membrane of the cell includes a fluoropolymer layer that is thermally bonded to a thermoplastic resin layer and subsequently expanded in at least one direction to produce a discontinuous layer of thermoplastic material.

The present invention also provides a method for constructing an air depolarized cell using composite ePTFE/thermoplastic films. This method includes heating a composite ePTFE/thermoplastic film to a temperature above the melting point of the thermoplastic layer and then contacting the side of the composite film that has the thermoplastic layer to the catalytically active layer of the cell, the electrode. The films may be optionally expanded in at least one direction. Furthermore, the films may be optionally metallized.

These and other aspects and advantages will become more apparent when considered in view of the following detailed description, drawing figures, and appended claims.

DETAILED DESCRIPTION OF THE INVENTION

Figure 1:
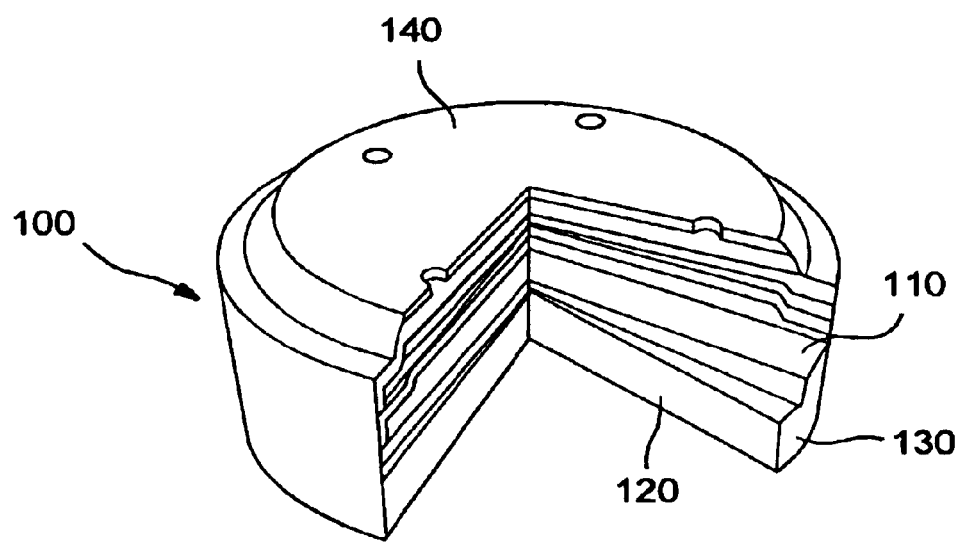
FIG. 1 is a cut-view diagram of a metal/air cell. (From The Handbook of Batteries, by David Linden, Second Edition, McGraw-Hill, Inc. 1994).

The gas diffusion membrane of the present invention is used in electrochemical devices, and in particular in an air depolarized cell. The membrane is formed from a porous fluoropolymer layer that is thermally bonded to a thermoplastic material, subjected to a thermal expansion and cooled. A suitable expanded polytetrafluoroethylene (ePTFE) material is the nonwoven ePTFE films disclosed by Bowman in U.S. Pat. No. 4,598,011, by Branca in WO 96/07529 and by Bacino in U.S. Pat. No. 5,476,589, the contents of which are incorporated herein by reference. The ePTFE films described therein are extremely thin, strong, chemically inert and intrinsically can have a high air flow-through rate.

Suitable fluoropolymers for making ePTFE films include PTFE and PTFE copolymers. The PTFE can also be a type of PTFE with co-monomers, referred to as "modified PTFE". This designation also covers polymers in which the homopolymer is modified by copolymerization with ethylenically unsaturated co-monomers, their share being <2 mass percent based on the copolymer. Examples of such co-monomers include the following: ethylene, propylene, halogenated olefins such as hexafluoropropylene, vinylidene fluorides and chlorotrifluoroethylene; cyclic fluorinated monomers or perfluoroalkylvinylethers such as perfluoropropylvinylethers, perfluoromethylvinylethers or perfluorobutylether. If the proportion of copolymer is more than 2 mass percent, the fluoropolymers are typically referred to as fluorothermoplastics or fluoroelastomers.

Other suitable starting raw materials include fluorinated homopolymers. Fluorinated homopolymers can be present as blends with low-molecular PTFE or blends with modified PTFE. The fluorinated homopolymers are likewise mixable with tetrafluoroethylene (TFE) copolymers processed from the melt, such as hexafluoropropylene/tetrafluoroethylene copolymers (FEP), perfluoroalkylvinyl/tetrafluoroethylene copolymers (PFA) or perfluorodioxol copolymers, such as those available under the brand name Teflon AF from Dupont. The use of fluorothermoplastics is disclosed by Gleinser in U.S. Pat. No. 6,127,486.

The fluoropolymers in this invention may be expanded (i.e., drawn) in one or more directions to render the fluoropolymer porous. The porous fluoropolymer can be in the form of a tape or membrane. The microstructure of the porous fluoropolymer can include nodes and fibrils, only fibrils, only fibril strands or bundles, or stretched knots interconnected by fibrils.

Suitable fluoropolymer membranes include uni- or biaxially stretched polytetrafluoroethylene membranes. A suitable pore size of the fluoropolymer is in the range of 0.01 to 15 microns. The thickness of the porous fluoropolymer membrane can be between 1 to 1000 microns, or in a range of between 5 and 500 microns or between 10 and 100 microns.

Conductive carbon can be added to the fluoropolymer gas diffusion layer during the process of making ePTFE. In Japanese Laid-Open Patent Application No. 57-30270, Kato describes the use of small carbon particles of no more than 1 micron in ePTFE at a loading of 7 to 80 wt. %. For the present invention, a suitable range for carbon loadings is between 15 to 50 wt. %. The carbon can be any conventional carbon. Non-limiting examples of carbon that may be used in the present invention include Black Pearls 2000 (Carbot), Vulcan XC-72 (Carbot), Shawinigan Black (Chevron), Ketjen Black, PWA (Calgon), Darco(Norit), and Denka black. The gas diffusion layer of this invention may contain at least 10% carbon by weight, at least 12% carbon by weight, less than 50% carbon by weight and less than 30% carbon by weight.

In one embodiment of this invention, a fluoropolymer membrane is coated with a thermoplastic material, which may have adhesive properties, to form a composite film. The layered composite film is expanded (i.e., drawn) in at least one direction. After an appropriate degree of expansion, the thermoplastic material becomes discontinuous, (i.e., begins to develop cracks, voids, or pinholes as a result of not being able to wet the fluoropolymer membrane surface completely.) If the composite film is expanded enough, the thermoplastic material may become so discontinuous that it exists on the surface of the fluoropolymer membrane as islands. The degree of discontinuity is dependent on the specific expansion process used. In one embodiment, the total thickness of the layers is between 3 and 30 microns. Because composite films with a greater degree of discontinuity have higher gas permeability, the ability to vary the discontinuity of the thermoplastic layer, from completely continuous to discontinuous, results in the ability to control the gas permeability of the composite film. In another embodiment, the thermoplastic material is perforated in a random or regular manner prior to being bonded to the fluoropolymer membrane to form a composite film, which may be optionally expanded.

Suitable thermoplastic materials are fluorinated thermoplastic films such as FEP (available under Teflon FEP—DuPont, Algoflon-Ausimont, Neoflon AP-Daikin, Hostaflon TFA-Dyneon), FEP (available from Saint Gobain), PFA (perfluoroalkoxy copolymer available under Teflon PFA—DuPont, Neoflon-Daikin, Hostaflon PFA-Dyneon), ECTFE (ethylene chlorotrifluoroethylene, available under Halar-Ausimont), ETFE (ethylene tetrafluoroethylene, available under Tefzel-DuPont, Aflon COP-Asahi Glass, Neoflon Daikin, Hostaflon ET-Dyneon), and MFA (copolymer of tetrafluoroethylene and perfluoromethyl vinyl ether available under Algoflon-Ausimont). A typical fluorinated polymer composite film for use as a gas diffusion membrane according to this invention has the following properties: thickness in the range of 1–100 micron, inclusive; weight per unit area of 5–80 $g/m^2$; density of 1.3 to 2.20 $g/cm^3$; oxygen permeability between 200 and 20000 $cm^3$ $mm/m^2$ day at 37.8° C. and 100% $O_2$; and a break strength of 0.2–20 kg/cm.

A measure of the permeability of these composite fluoropolymer films is given by their Gurley number. A suitable Gurley number is in the range between 25–10000 seconds, but films with Gurley numbers between 500–2500 seconds are particularly useful. For films with Gurley numbers <1800 sec, the value of the Gurley number is determined according to TAPPI T460 om-96. For films with Gurley numbers >1800 sec, the Gurley number is determined using TAPPI T536 om-96. Oyxgen permeation is measured using the Ox-Tran 2–20 system (by MOCON), which conforms to ASTM D3985. Water permeation is measured by the Permatran W 3/31 system (by MOCON), which follows ASTM F-1249. For the film thickness measurements reported herein, measurements were made using a Heidenhain thickness tester. The film thickness values obtained by this method reflect the full composite ePTFE/thermoplastic layer thickness, and not the film thickness at a region of the composite film where there is no thermoplastic layer.

The break strength of the films is measured using an Instron machine operated with a crosshead speed of 12 inches/min at a constant rate of extension. The specimen has a width of 1 inch and a length of 4 inches, with the grip distance set at 4 inches as well.

In water sessile contact angle measurements to measure the hydrophobicity of the film, the water contact angle, which is the angle between the baseline of the drop and the tangent at the drop boundary, is measured using equipment such as the Contact Angle Measuring Systems G10 or Contact Angle Measuring System G2 from A. Kruess Optronic GmbH. For gas diffusion membranes of this invention, the water contact angle is >110°, with 120° being a particularly useful value. All contact angle measurements were made using de-ionized water.

Figure 2:
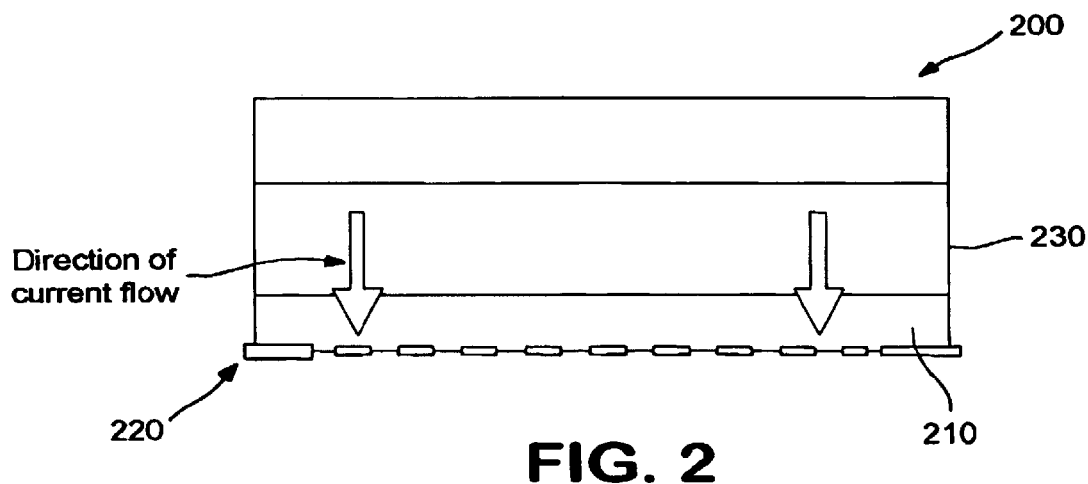
FIG. 2 is a schematic diagram of an electrode assembly using a conductive gas diffusion membrane, as described in one embodiment of the present invention.
Figure 3:
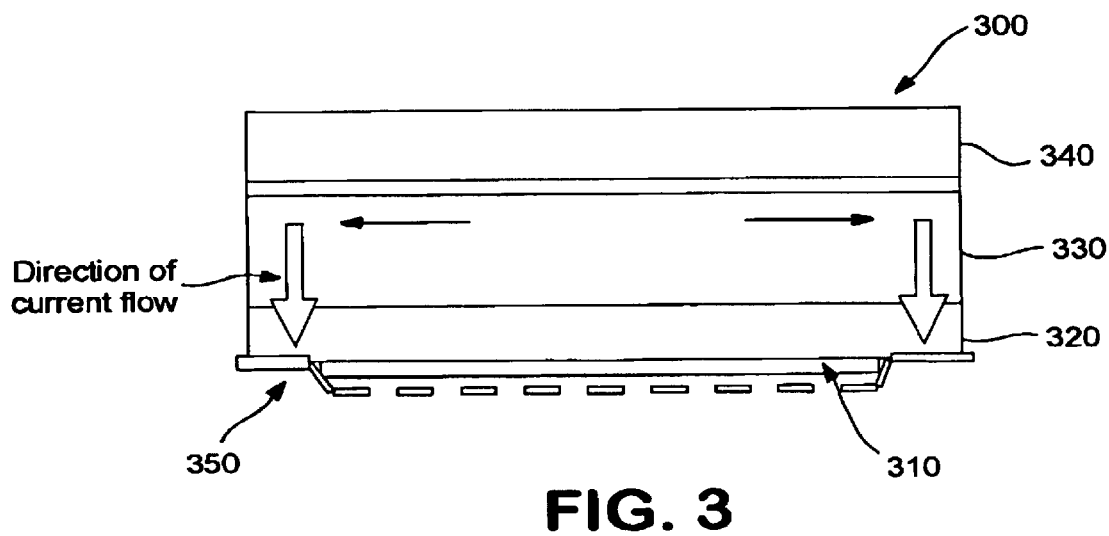
FIG. 3 is a schematic diagram of air electrode with conductive gas diffusion layer and non-conductive air distribution layer, as described in one embodiment of the present invention.

When carbon particles are incorporated in the gas diffusion layer as described above, the volume resistivity of the film may range between 0.1 and 1000 Ohm-cm, with a useful range between 1 and 500 Ohm-cm. The volume resistivity is measured according to Mil-G-83528A (Mar. 31, 1988, distribution statement A, approved for public release). FIG. 2 shows one embodiment of the present invention, wherein a gas diffusion membrane 210 with incorporated carbon particles is pressed directly against a metal can 200 that serves as a cell housing. The conductive gas diffusion membrane 210 is also in contact with cell can bottom 220 and catalytic layer 230. The cell optionally can be textured to improve the lateral air distribution around the cell vent holes. FIG. 3 shows another embodiment of the present invention, wherein a gas diffusion membrane 310 with incorporated carbon particles is combined with a non-conductive air distribution layer 320 inside cell 300. A catalytic layer 330 is in contact with conductive gas diffusion layer 310 and separator 340. Also, the conductive gas diffusion membrane 310 is in contact with cell can bottom 350. In these embodiments, the gas diffusion membrane contacts the metal can in the annular sealing area and the active layer is metallized.

In one embodiment of this invention, the catalytically active layer includes manganese dioxide and carbon supported on a fluoropolymer tape. Other catalytic materials may be included, such as metals like silver, platinum, palladium, osmium, and ruthenium or other oxides of metals or manganese ($MnO_x$ x=1 to 2). Combinations of $MnO_x$ and Ag also can be used. The density of the catalytic layer may be in the range of 0.1 and 1.5 g/cm$^3$, with a useful range between 0.4 and 1.0 g/cm$^3$. A suitable value for the total thickness of the catalytic active layer can be in the range between 20 and 400 microns, with a particularly useful range between 50 and 200 microns.

When $MnO_2$ is used in the catalytic active layer, the maximum $MnO_2$ loading is 20% by weight, with a useful range between 1 and 10% by weight of the total catalytic active layer. The manganese dioxide can be in the form of particles, and can be formed from any $Mn^{2+}$ salt (for example nitrate, acetate, carboxylate) through oxidation or thermal reactions. The salt can be applied to the film by coating, spraying, or imbibing techniques, or combinations thereof. Alternative processes employ $KMnO_4$ as mentioned in U.S. Pat. No. 3,948,684. Furthermore, processes to make manganese dioxide impregnated films are published in WO 01/71830, WO 01/91225, and WO 00/36676. The subject matter of all of these patents is incorporated herein by reference.

The catalytic active layer can contain combinations of different types of conductive carbon. As an example, two or more types of particulate carbon can be blended. Non-limiting examples of possible blends include mixtures of carbon with different primary particle size, mixtures of conductive carbon and activated carbon, and mixtures of spherical carbon and nanosized carbon fibers.

The catalytically active layer may contain 50 to about 95% carbon by weight, with a useful range between 60 to 90% by weight. However, in certain embodiments, carbon is the only electroactive component of the catalytic active layer (i.e., no $MnO_2$ is present). In this context, the term "electroactive" is used to describe a layer or a component that has electrochemical or electrocatalytic properties.

The carbon can be any conventional carbon. Non-limiting examples of carbon that may be used include Black Pearls 2000 (Carbot), Vulcan XC-72 (Carbot), Shawinigan Black (Chevron Chenical Co.), Ketjen Black (Akzo Nobel, Ltd.), PWA (Calgon Carbon Corp.), Darco(Norit) and Denka black.

Certain embodiments of this invention provide a composite film that includes at least one fluoropolymer layer bonded to an electroactive layer that has metal deposited on one or more major surfaces to act as a thin current collecting layer. Silver, nickel, gold or alloys thereof are some examples of suitable metals for this purpose. The morphology of the deposited metal layer may vary, but a porous, electrically continuous network along a PTFE/carbon structure is a particularly useful form. The metal is deposited under conditions to produce submicron (less than 200 nm) grains on the surface of the nodes and fibrils, only on fibrils, on fibril strands, on bundles of fibrils or else on stretched knots interconnected by fibrils and carbon particles. The metal can also be at the fluorothermoplastic material surface regions if used in the composite. In some embodiments, metal layers with high specific surface area are formed. For example, the specific surface area of the metal layer may be greater than 20 m$^2$/g, greater than 50 m$^2$/g, less than 1400 m$^2$/g, and less than 800 m$^2$/g. The specific surface area of the metal is measured by the standard Brunauer-Emmett-Teller (BET) method.

Examples of known metal deposition techniques that can be employed are physical vapor deposition (PVD), chemical vapor deposition (CVD), and sputtering. Optionally, magnetron sputtering or electron beam sputtering and/or evaporation may be employed. The surface resistance of the metal layer may be between 0.01 and 30 Ohm/square, with a useful range between 0.03 and 15 Ohm/square. In some embodiments, the deposition results in a porous metal overlayer with a thickness in the range of 50 and 500 nm, inclusive. Also, in some embodiments, penetration of metal into the microporous cathode is in the range of 1 and 20 microns, inclusive.

In certain embodiments of the present invention, a separator layer may be laminated to the catalytic active layer. The separator layer can be made from hydrophilic microporous materials, examples of which include hydrophilic polypropylene (PP) Celgard®, polyethylene (PE), PVC, cellophane, nylon, or grafted polymers. Separators may also be made from hydrophilic ePTFE membranes (U.S. application Ser. No. 09/509,232). A suitable thickness for the separator membrane is between 10 and 100 microns, while a suitable mean flow pore size can range between 0.05 to 3 microns. A useful film porosity is 40% or greater. An additional non-woven material can be employed as an electrolyte reservoir.

EXAMPLE 1
Fabrication of an Eptfe/Thermoplastic Composite Film

The fluoropolymer membrane used in the present invention can include the porous, nonwoven ePTFE films as disclosed by Bacino in U.S. Pat. No. 5,476,589, the contents of which are incorporated herein by reference. The ePTFE films described therein are extremely thin, strong, chemically inert and intrinsically have a high air flow-through rate.

To manufacture an ePTFE/thermoplastic composite film according to the present invention, a PTFE fine powder with a low amorphous content and at least a 98% degree of crystallization is used as a raw material. The PTFE fine powder is mixed with a lubricant (such as, but not limited to, a mineral spirit or naptha) to form a paste which is then extrusion molded into the form of a tape. The tape is then split into three rolls, layered together, compressed between rolls to a thickness of 0.03 inches, and then stretched transversely to 2.6 times its original width. It should be noted that the tape optionally may be split into up to five rolls, or not split at all. The lubricant is driven off by heating. The tape then undergoes a first longitudinal expansion to a 35:1 ratio. Following the first expansion, a 0.001 in. thick thermoplastic material is layered with the PTFE and then the composite film is subjected to a second longitudinal expansion (1.5:1 ratio) at 320° C. and a composite first transverse expansion (6:1 ratio) at 340° C. followed by a 360° C. sintering while being restrained.

A suitable thermoplastic polymer is tetrafluoroethylene/hexafluoropropylene copolymer (hereafter abbreviated as FEP). However, other thermoplastic fluoropolymers capable of thermally bonding to ePTFE can be used. Useful examples include, but are not limited to fluoropolymers, such as Teflon PFA, and polyolefins such as polyethylene, polypropylene, etc.

The composite film temperature should be held above the melting temperature of the thermoplastic material. This requirement ensures that the layer of thermoplastic material has "low melt strength" and is just carried by the ePTFE during the expansion steps. For the case of the FEP/ePTFE composite film, the temperature is held at 340° C., which is above the FEP melting temperature of 265° C. It is believed that the layer becomes discontinuous when the ePTFE layer is stretched to the point where there is not enough thermoplastic material to cover or wet the ePTFE surface completely.

Figure 4:
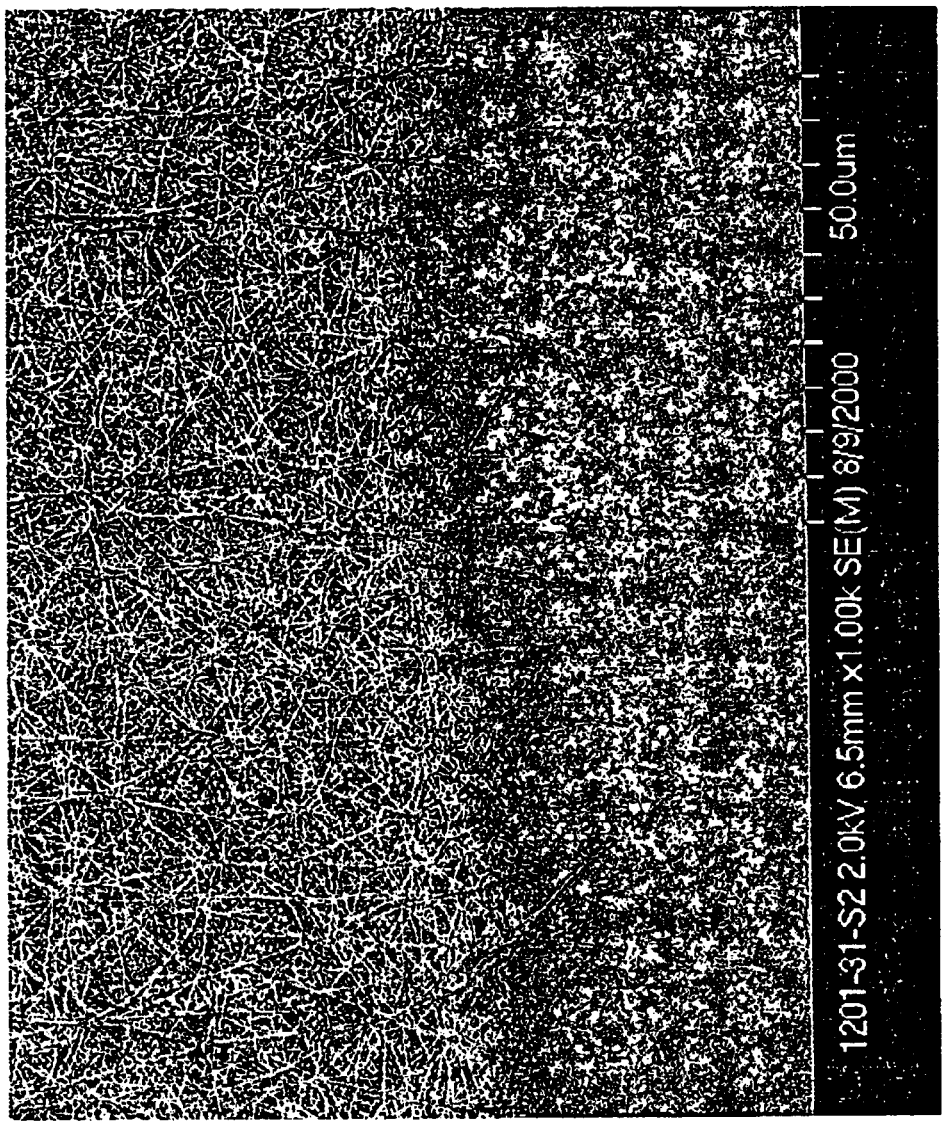
FIG. 4 is an SEM image illustrating an ePTFE/FEP layer according to the current invention.

FIG. 4 shows a top-view scanning electron microscope (SEM) image at 1737× magnification of a discontinuous layer of FEP on an ePTFE layer. The top half of the picture clearly shows the fibril structure that is characteristic of ePTFE. In the bottom half of the picture, the fibril structure is masked by the edge of an FEP island on the surface of the ePTFE.

EXAMPLE 2
Fabrication of a Catalytic Air Cathode

Figure 5:
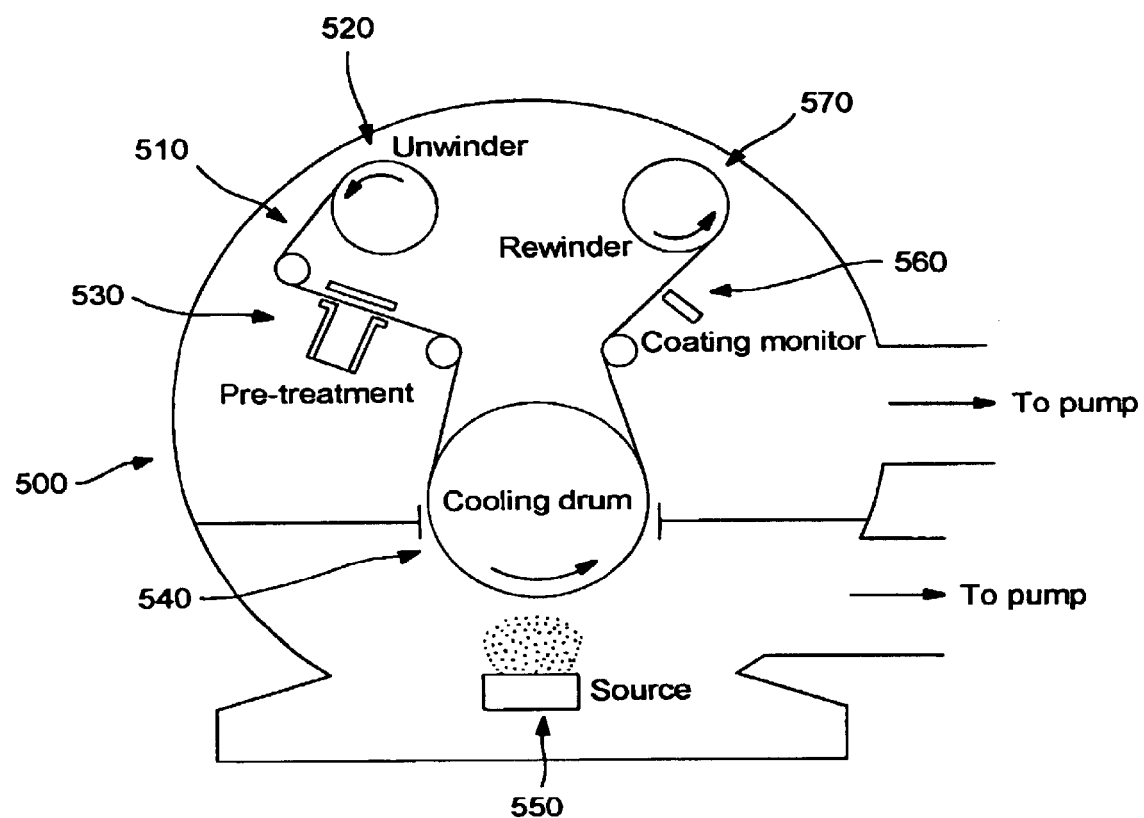
FIG. 5 is a schematic diagram of a coating apparatus that can be used to metallize a polymer layer according to the present invention.

Chemical manganese dioxide (Cerac) was ball milled for 16 hours to reduce its particle size. Thirty grams of $MnO_2$ and 99 grams of Darco G60 activated carbon (Norit) were slurried in water using a Silverson Homogenizer. A PTFE dispersion was added and mixing continued to coagulate the dispersion. The coagulum was dried at 165° C. for 16 hours. The composition of the dry coagulum was 66% carbon, 20% manganese dioxide and 14% PTFE by weight. The coagulum was then mixed with 0.8 pound per pound of 40% n-propanol in water. The resulting mixture was cross calendered to a thickness of 0.012 inches. The water and alcohol were removed thermally. The density of the electrode used in this example was 0.83 g/cc. This tape was then metallized with a porous layer of silver metal on one surface. The apparatus used for metallization is given in FIG. 5. Tape 510 is placed on unwinder 520 in chamber 500 and run past pre-treatment zone 530 to cooling drum 540. As tape 510 winds around cooling drum 540, it is exposed to metal source 550. The deposition is monitored by coating monitor 560 and wound on rewinder 570.

In the coating process, a roll of polyester film, to which the carbon air electrode samples were adhered, were loaded into a coating chamber that was closed and pumped down. After the coating source (in this case, a Ag source) was brought to the nominal coating rate, the shutter separating the film from the source was opened. The film was unwound from its roll at a certain tension and transported continuously over the coating source. The coated film was rolled up on a separate roll.

Physical vapor deposition (PVD) generates heat. The coated film was cooled on a drum in the coating zone. When the entire roll was coated, the sources were turned off. The process conditions are summarized below.

| Metal/<br>Evap. Rate<br>[g/min] | Web<br>Speed<br>[m/s] | Web<br>Tension<br>[N] | Expected Silver<br>Thickness<br>[nm] |
|---|---|---|---|
| 2 × 6 Ag | 0.1 | 50 | 300 |

Figure 6:
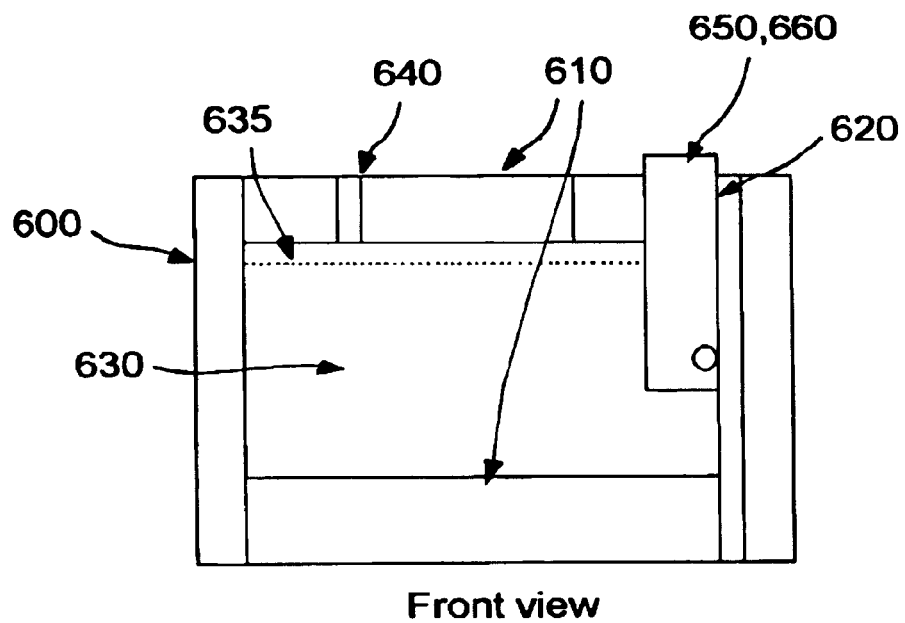
FIG. 6 illustrates (a) a front view of a three-electrode half cell. (b) a side view of a three-electrode half cell.
Figure 6:
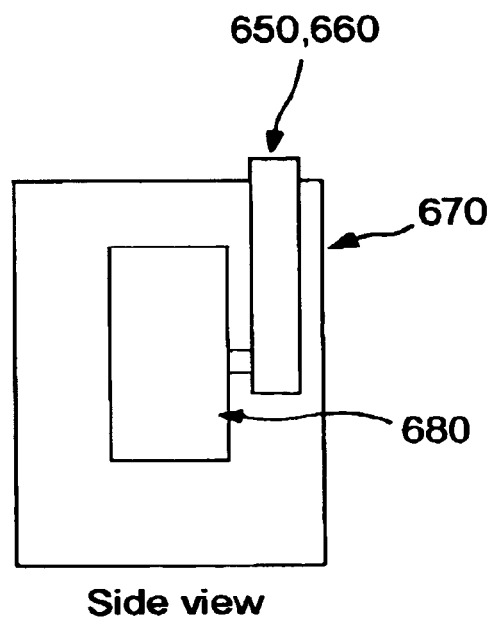

The resulting air electrode assembly had a sheet resistance of 10.5 ohms/square. Its electrochemical performance was tested in a three-electrode half-cell constructed as shown schematically in FIGS. 6a and 6b.

The nickel end plates were secured to the plastic body of the half cell using nylon bolts and nuts (omitted from FIG. 4 for clarity). The nickel counter electrode 600 was sealed to the acrylic plastic cell body 610 using a Gore-Tex® gasket. The air electrode 620 served as the gasket between the nickel plate and the cell body on that end of the cell. The cell was filled with 31% potassium hydroxide solution 630 to a level 635 slightly below the cell vent. This allowed any gases which were produced at the counter electrode to exit the cell through the vent 640. The reference electrode 650 was a mercury/mercuric oxide type, which is commonly used in strongly alkaline electrolytes. A luggin capillary 660, which is simply an electrolyte-filled channel, connected the reference electrode 650 and the air electrode 620. This is a common technique for determining the potential near the surface of an electrode. A nickel plate 670 contacted the air electrode. The cell was connected to a potentiostat/galvanostat (Solartron 1280B) which was operated using Corrware™ software (Scribner and Associates). This instrument provided automatic recording of current versus voltage while the voltage was varied with time. A sample of metallized catalytic air electrode was installed in this test cell with the metallized side toward the electrolyte side and the carbon side toward the air window 670. The cell was connected to the instrument and the potential of the air electrode 620 was varied linearly with time in a range of +0.1 volt to −0.8 volt versus the Hg/HgO reference electrode at a rate of 5 millivolts per second. After cycling between these voltages several times, it was clear that the magnitude of the current due to oxygen reduction was increasing. This was taken as an indication that the electrode was slowly wetting with electrolyte. The electrode 620 was then allowed to stand for 72 hours in contact with the electrolyte to reach a steady state. The steady state performance was verified by recording two successive I versus E curves which were nearly identical. The last curve is given in FIG. 7.

Figure 7:
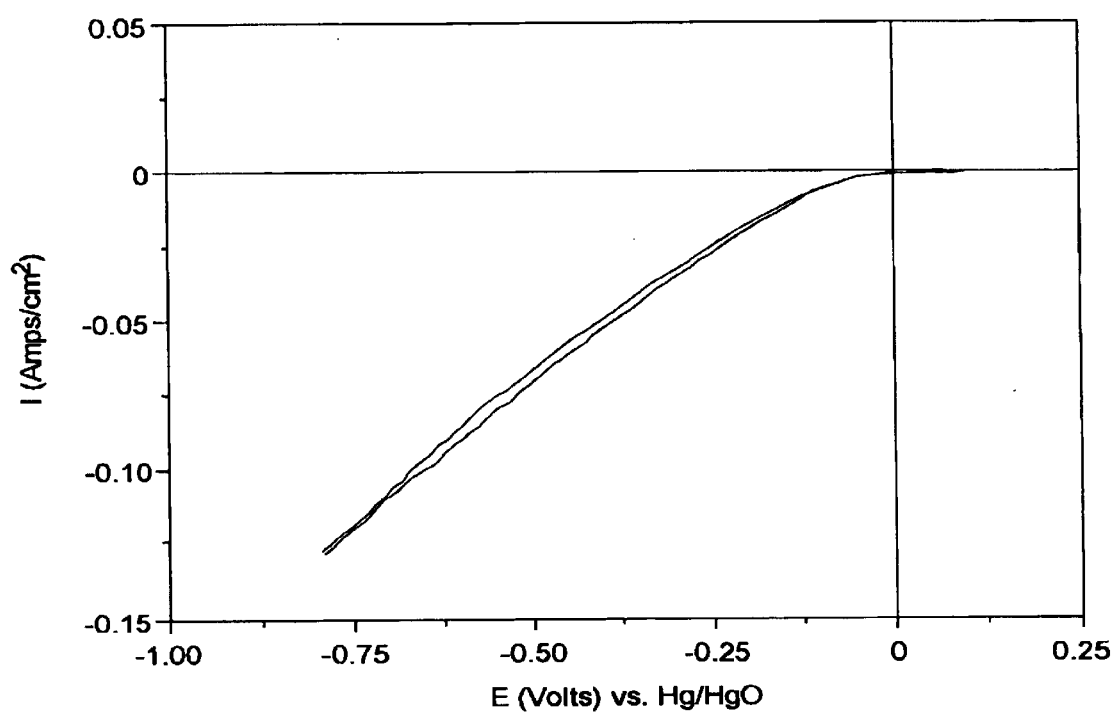
FIG. 7 is a current versus voltage plot obtained after allowing electrolyte to wet the electrode for at least 72 hours.

The generally linear shape of the curve in FIG. 7 shows that the current was limited by the resistance of the cell and not by any non-linear diffusion-limited behavior. To be certain that the cell output was indeed from the oxygen electrode and not from some other electrochemical reaction, the air supply was blocked at the air window. After a few seconds, the current decreased rapidly, but recovered rapidly when the air supply was restored. Another observation was that all the ionic current had to pass through the metallized current collector indicating that it was sufficiently porous to serve as a current collector in an air electrode. The metallization also reduced the resistance of the electrode. In the electrochemical test, at −0.5 volt versus Hg/HgO, the current for the metallized electrode was −0.079 mA/cm$^2$ versus −0.030 mA/cm$^2$ for the unmetallized electrode.

EXAMPLE 3

Fabrication of a Complete Air Electrode Assembly

The composite ePTFE/thermoplastic film described in Example 1 was laminated according to the following procedure:

1. A 2.5×3.5 inch sample of the electrode in Example 2 was prepared.
2. A 1×2 inch sample of the film in Example 1 was placed on the carbon side of the air electrode. The tacky side of the film was placed away from the electrode.
3. The platens of a four post press (Phi) were heated to 270° C.
4. The lay-up was placed between sheets of aluminum foil and was inserted into the press
5. The press was closed and the force was set to 800 pounds.
6. The material was pressed for 5 minutes, removed, and air cooled.

The resulting laminate had excellent adhesion as demonstrated by the fact that the film could not be removed without destroying the electrode layer. The laminate was then installed in the test cell described in Example 2, and was tested using the same routine. The current versus voltage curve for this electrode is provided in FIG. 8.

Figure 8:
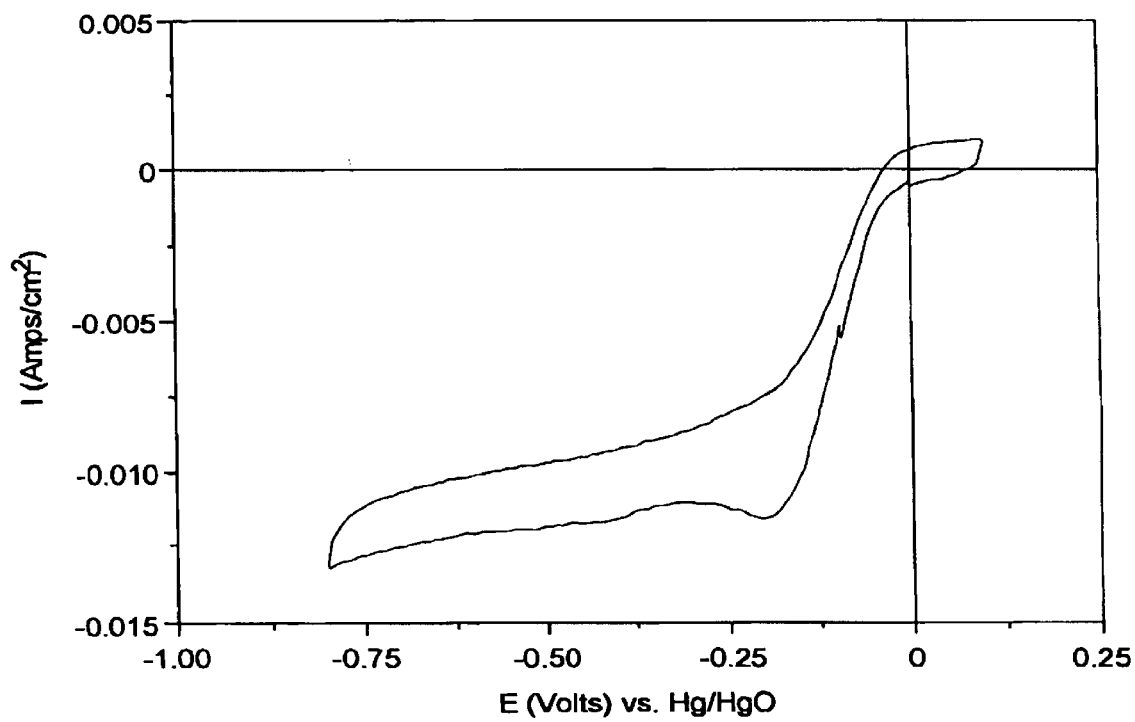
FIG. 8 is a current versus voltage plot obtained from a complete air electrode assembly as discussed in Example 3.

The break in slope of the curve in FIG. 8 indicates that current is controlled by oxygen diffusion below −0.25 volts versus Hg/HgO. Above that potential, the current very closely matches that of the bare electrode. Below that potential, the current is limited by the diffusion of oxygen through the composite film. The limiting current is approximately 11 mA/cm$^2$. Although this is somewhat below the typical limiting current of 50 to 100 mA/cm$^2$ of commercial zinc-air cells, it is believed that the higher limiting current can be achieved through simple manipulation of the film properties and lamination conditions. In any event, this example shows that current can be obtained using composite films laminated to a carbon/catalyst/PTFE layer and coated with a thin metal layer.

Figure 9:
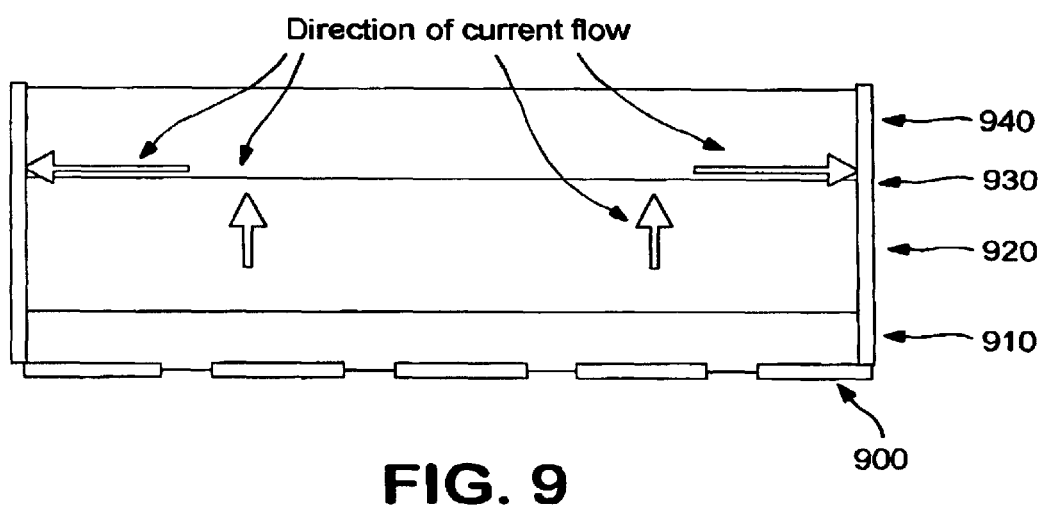
FIG. 9 is a schematic diagram of a metallized electrode according to the present invention.

A schematic diagram of a possible air depolarized cell using the present invention is shown in FIG. 9, and in particular, one possible configuration of a porous metal layer and a catalytic layer. For clarity, the metal/electrolyte and sealing grommet has been left out of the picture. In FIG. 9, cell 900 contains gas diffusion layer 910 in contact with catalytic layer 920. A porous metal layer 930 is deposited on catalytic layer 920. A separator 940 separates the cathode from the rest of the cell.

The foregoing description and examples have been presented for purposes of illustration. They are not intended to be exhaustive or to limit the invention to the precise form disclosed. Hence, many modifications and variations are possible in light of the above teaching.

We claim:

1. An electrode for an electrochemical cell comprising an electrode having an electroactive layer and a fluoropolymer composite layer, said fluoropolymer composite layer including at least one porous fluoropolymer layer and at least one discontinuous thermoplastic layer, wherein said at least one discontinuous thermoplastic layer adheres said at least one porous fluoropolymer layer to a major surface of said electroactive layer.

2. An electrode for an electrochemical cell according to claim 1, wherein said electroactive layer contains a catalyst.

3. A method of making an electrode comprising: providing a porous fluoropolymer layer and adhering a thermoplastic layer thereto to form a composite, expanding the composite in at least one direction to produce a discontinuous thermoplastic layer, and attaching said composite to an electrode by affixing said discontinuous layer to a surface of said electrode.

4. A method of making an air depolarized cell comprising: providing an electrode, providing a composite membrane for the electrode, wherein the composite membrane includes a fluoropolymer layer, a discontinuous thermoplastic layer, and an electroactive layer coated with a metal layer, and attaching said composite membrane to said electrode.

5. An electrode assembly, said electrode assembly including at least one electrode containing at least a first major surface having an expanded fluoropolymer layer on said first surface, and a discontinuous layer of an adhesive.

6. An electrode assembly according to claim 5, wherein said at least one electrode contains a catalyst.

7. An electrochemical cell comprising an electrode having a major contact surface and a polymer composite layer, said layer including at least one porous fluoropolymer layer and at least one discontinuous thermoplastic layer, wherein said at least one discontinuous thermoplastic layer adheres said at least one porous fluoropolymer layer to said surface.

8. An electrochemical cell according to claim 7, wherein said electrode contains a catalyst.

9. A battery comprising an electrode with an electroactive layer that has a metal overlayer, first and second major contact surfaces, and a polymer composite layer, said layer including at least one porous fluoropolymer layer, at least one discontinuous thermoplastic layer, wherein said at least one discontinuous thermoplastic layer adheres said at least one porous fluoropolymer layer to one of said major contact surfaces.

10. An air depolarized cell comprising an electrode having first and second major contact surfaces and a gas diffusion membrane, said gas diffusion membrane including at least one porous fluoropolymer layer and at least one discontinuous thermoplastic layer, wherein said at least one discontinuous thermoplastic layer adheres said at least one porous fluoropolymer layer to one of said major contact surfaces.

11. An air depolarized cell according to claim 10, wherein at least one said major contact surface includes an electroactive layer that has a porous, electrically continuous metal overlayer and additionally is penetrated by metal.

12. The air depolarized cell of claim 10, wherein the gas diffusion membrane has a thickness less than 50 microns.

13. The air depolarized cell of claim 10, wherein the thermoplastic material is a thermoplastic fluoropolymer.

14. The air depolarized cell of claim 10, wherein the thermoplastic fluoropolymer is FEP.

15. The air depolarized cell of claim 10, wherein the fluoropolymer layer is an ePTFE layer.

16. The air depolarized cell of claim 11, wherein the metal overlayer has a thickness between 50 and 500 nm.

17. The air depolarized cell of claim 10, wherein the thickness of the gas diffusion membrane is less than 30 microns.

18. The air depolarized cell of claim 10, wherein the thermoplastic layer comprises a polyolefin.

* * * * *